S. W. HIGGINS.
VEHICLE WHEEL.
APPLICATION FILED OCT. 25, 1907.
933,708.
Patented Sept. 7, 1909.
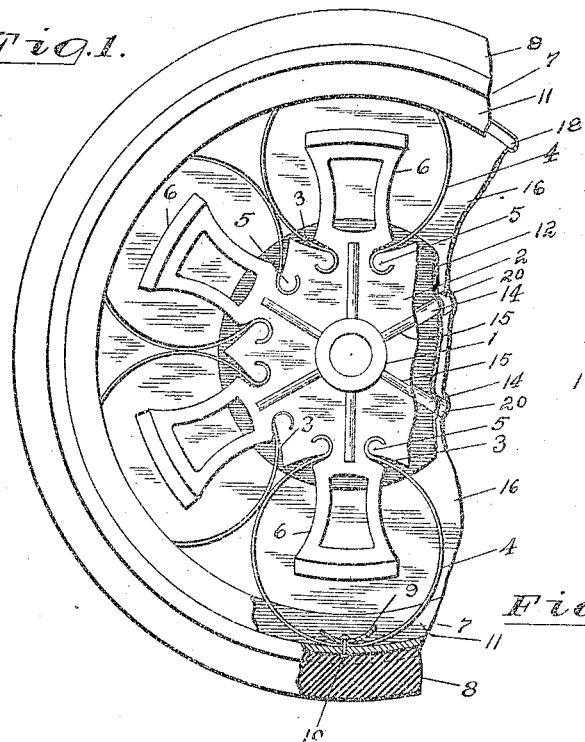
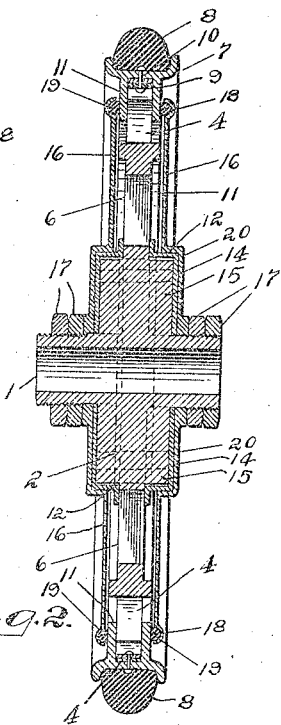
WITNESSES:
Walter A. Greenburg
Anna M. Dow
INVENTOR:
SYLVESTER W. HIGGINS
BY
ATTORNEYS.

UNITED STATES PATENT OFFICE.

SYLVESTER W. HIGGINS, OF DETROIT, MICHIGAN, ASSIGNOR OF ONE-HALF TO FRANK I. FARNSWORTH, OF DETROIT, MICHIGAN.

VEHICLE-WHEEL.

933,708.

Specification of Letters Patent.   Patented Sept. 7, 1909.

Application filed October 25, 1907.   Serial No. 399,220.

*To all whom it may concern:*

Be it known that I, SYLVESTER W. HIGGINS, a citizen of the United States of America, residing at Detroit, in the county of Wayne and State of Michigan, have invented certain new and useful Improvements in Vehicle-Wheels, of which the following is a specification, reference being had therein to the accompanying drawings.
This invention relates to vehicle wheels, and especially to the type wherein the rim or felly and the hub are held in yielding relation by interposed resilient members.

The invention consists in the matters hereinafter set forth, and more particularly pointed out in the appended claims.

Referring to the drawings, Figure 1 is a view in side elevation with parts removed and broken away of a wheel embodying features of the invention. Fig. 2 is a view in section of the wheel.

In the drawings, a tubular hub 1 has a central polygonal spider 2 whose facets 3 are concave to form seats for loops 4 of flat spring metal having slightly rounded edges and ends which are bent into hooks that closely engage rounded lugs 5 formed by transverse slots in the spider on each side of the shanks of a central radial projection 6 on each facet. The outer portions of the loops bear tangentially against the inner face of a deeply channeled rim 7, the outer face of the rim being grooved or fitted for a cushion tire 8 of any preferred type. Suitably curved plates 9 and rivets 10 secure the loops to the rim. The projections 6 of the spider 2 correspond in thickness to the width of the rim and are convex to mate with the inner margins of the flanges 11 of the rim on which they may seat themselves to act as stops to limit the compression of the springs. Disks or washers 12 are placed on each side of the spider 2, and have radial stiffening ribs 14 formed up or pressed out on their faces that interlock with similar ribs 15 on the spider. Face plates 16 are secured on the hub by suitable check-nuts 17 and overlap the rim flanges 11. A circumferential groove 18 on the inner face of each plate retains a packing ring 19 of proper material which bears against the adjacent rim flange and radial ribs 20 are pressed out of the plates to interlock with the disk ribs and thus hold the parts against interrotation.

One feature of the invention is the complete housing of the springs, thus preventing accumulation of dirt and adding to the appearance of the wheel without departing from its resiliency.

Another feature is the motion of the springs in unison obtained by the attachment of the spider and springs whereby a plurality of the springs are always in action, while the rounded edges of the loops readily move over the retaining washers with little friction and noise.

What I claim as my invention is:—

1. A wheel comprising a hub, a polygonal spider thereon with concave facets and a radial stop projecting from each facet and transverse slots in its periphery at the base of each stop, a rim concentric with the spider having inner annular marginal flanges, a flat bar of spring metal bent into a loop encircling each stop whose ends lie in the transverse slots of the spider and whose body bears against the rim between its flanges, a washer on each side of the spider bearing against the edges of the springs, and a pair of face plates on the hub bearing against the washers and having sliding engagement with the rim flanges.

2. A wheel comprising a hub, a polygonal spider thereon with concave facets and a radial stop projecting from each facet and transverse slots in its periphery at the base of each stop, a rim concentric with the spider having inner annular marginal flanges, a flat bar of spring metal bent into a loop encircling each stop whose ends lie in the transverse slots of the spider and whose body bears against the rim between its flanges, a washer on each side of the spider bearing against the edges of the springs, a pair of face plates having radial stiffening ribs secured on the hub whose inner faces bear against the washer and have sliding engagement with the rim flanges, a circumferential groove in the face of each plate near its margin, and a packing ring in the groove.

3. A wheel comprising a hub having a polygonal spider with concave facets, radial ribs on the spider, a channeled rim concentric with the spider, loops of flat spring metal in compression between the rim and the spider facets whose ends are detachably interlocked with the spider and whose bodies are secured against the inner face of the rim, washers on the hub bearing against the spring edges, hollow radial ribs struck out on each washer interlocking with the spider ribs, face plates secured on the hub bearing against the washers and the rim flanges, and provided with hollow ribs struck out on each plate interlocking with the washer ribs.

In testimony whereof I affix my signature in presence of two witnesses.

SYLVESTER W. HIGGINS.

Witnesses:
C. R. SICKNEY,
OTTO F. BARTHEL.